United States Patent [19]

Finkelmann et al.

[11] 4,358,391

[45] Nov. 9, 1982

[54] COMPOSITIONS CONTAINING LIQUID CRYSTAL PHASES

[75] Inventors: Heino Finkelmann; Günther Rehage, both of Clausthal-Zellerfeld; Georg Kollmann, Burghausen, all of Fed. Rep. of Germany

[73] Assignee: Wacker-Chemie GmbH, Munich, Fed. Rep. of Germany

[21] Appl. No.: 198,401

[22] Filed: Oct. 20, 1980

[30] Foreign Application Priority Data

Nov. 5, 1979 [DE] Fed. Rep. of Germany ....... 2944591

[51] Int. Cl.³ .................. G02F 1/13; C09K 3/34; C07F 7/08; C08G 77/40
[52] U.S. Cl. .................. 252/299.01; 252/299.4; 252/299.6; 252/299.67; 252/299.7; 260/397.2; 528/25; 528/26; 528/28; 528/29; 556/437; 556/439; 556/445; 556/450; 556/462; 350/340; 350/341
[58] Field of Search ........... 252/299.01, 299.4, 299.67, 252/299.6, 299.7; 350/340, 341; 528/28, 29, 25, 26; 260/397.2; 556/437, 439, 445, 450, 462

[56] References Cited

U.S. PATENT DOCUMENTS

| | | |
|---|---|---|
| 3,947,184 | 3/1976 | Saeva et al. .................. 350/340 |
| 3,989,354 | 11/1976 | Du Bois et al. ............... 350/340 |
| 4,151,326 | 4/1979 | Funada et al. ................ 252/299.4 |
| 4,273,420 | 6/1981 | Watanabe et al. ............. 350/341 |
| 4,293,435 | 10/1981 | Portugall et al. ............ 252/299.01 |
| 4,316,041 | 2/1982 | Totten et al. ................ 252/299.68 |

FOREIGN PATENT DOCUMENTS

| | | | |
|---|---|---|---|
| 48-94693 | 12/1973 | Japan .................. | 252/299.4 |
| 52-477745 | 4/1977 | Japan .................. | 252/299.4 |
| 52-76050 | 6/1977 | Japan .................. | 252/299.4 |
| 54-24831 | 2/1979 | Japan .................. | 252/299.4 |

OTHER PUBLICATIONS

Kahn, F. J., et al., Proc. IEEE, vol. 61, No. 7, pp. 823-828, (1973).

Tsvetkov, V. N., "Structure and Properties of Rigid--Chain Polymer Molecules in Solutions", Advances in Liquid Crystal Research and Applications, Bata, L., Pergamon Press, vol. 2, pp. 813-843, (1980), Proceedings of the 3rd. L.C. Conference of The Socialist Countries, Budapest, 27-31 Aug. 1979.

Young, W. R., et al, Mol. Cryst. Liq. Cryst., vol. 13, pp. 305-321, (1971).

*Primary Examiner*—Teddy S. Gron

[57] ABSTRACT

Compositions having liquid crystal phases which contain at least one component consisting of an organopolysiloxane having mesogenic molecules chemically bonded thereto as side chains which are obtained by grafting vinyl-substituted mesogenic molecules to an organohydrogenpolysiloxane. The organopolysiloxane backbone may also carry different molecules, such as nematogenic and cholesterogenic or chiral molecules, as side chains.

6 Claims, No Drawings

COMPOSITIONS CONTAINING LIQUID CRYSTAL PHASES

The present invention relates to compositions having liquid crystal phases and more particularly to compositions having liquid crystal phases in which one component consists of an organopolysiloxane having mesogenic molecules chemically bonded thereto as side chains.

BACKGROUND OF THE INVENTION

Liquids which under certain conditions, have properties otherwise observed only with crystalline solids, such as optical anisotropy, have been known for a long time. Recently, such properties have also been observed in macro-molecular systems, for example, with polyacrylate and methacrylate esters. Nematic phases of such polymeric systems generally exist at temperatures above 100° C.

Therefore, it is an object of this invention to provide polymeric systems in which the polymeric material has a liquid crystal phase even at relatively low temperatures, particularly at and below room temperature. Another object of this invention is to prepare systems having liquid crystal phases over a wide range of pressure and temperature, and have lower viscosities than known systems. Still another object of this invention is to prepare systems having liquid crystal phases whose properties, such as viscosity, type of liquid crystal phase, position and temperature range in which the liquid crystal phase exists can be tailored to the requirements of the particular application. A further object of this invention is to prepare macromolecular systems in which the liquid crystal can be obtained at or even below room temperature.

SUMMARY OF THE INVENTION

The foregoing objects and others which will become apparent from the following description are accomplished in accordance with this invention, generally speaking, by providing compositions having liquid crystal phases in which at least one component consists of an organopolysiloxane backbone having chemically bonded mesogenic molecules as side chains.

DETAILED DESCRIPTION OF THE INVENTION

The present invention thus relates to polysiloxanes having nematic or cholesteric properties, mixtures of polysiloxanes having nematic, cholesteric or nematic and cholesteric properties, and polysiloxanes which carry both nematogenic and cholesterogenic or chiral molecules as side chains. It is preferred that the compositions have nematic or cholesteric properties.

Moreover, a single component often has smectic or chiral properties. A composition having cholesteryl or nematic properties containing such a component is formulated so that at least one nematic component is mixed with the smectic or chiral components. The amount of the smectic or chiral component usually does not exceed about 50 percent.

The compositions of this invention are prepared by mixing the separate components. Thus, an individual component having liquid crystal properties may be obtained by grafting mesogenic molecules to an organopolysiloxane. In preparing the individual component, organohydrogenpolysiloxanes are reacted in equimolar amounts with vinyl-substituted mesogenic molecules, in the presence or absence of a solvent and in the presence of catalysts which promote the addition of Si-bonded hydrogen to aliphatic multiple bonds.

Because of their availability, methyl groups are preferred as the organic radicals on the organohydrogenpolysiloxanes, but organohydrogenpolysiloxanes having other alkyl and aromatic substituents are also used, particularly as blending ingredients. The polysiloxanes used as starting materials in accordance with this invention are endblocked with organic radicals, preferably methyl groups.

It is preferred that the proportion of Si-H bonds in the organohydrogenpolysiloxane should not exceed the number of silicon atoms, since hydrogen evolution is frequently observed in the grafting reaction if the Si-H content is too high. This in turn could lead to non-reproducible results. Furthermore, the proportion of Si-H groups and the distribution density of the mesogenic groups resulting from it is determined by the application requirements as well as by such properties as the space requirements of the mesogenic molecules or strength of the mutual interaction between the polymer backbone and mesogenic molecules, as well as between neighboring mesogenic molecules.

The chain length of the organohydrogenpolysiloxane used for the grafting reaction in this invention can be varied within wide limits. It is limited primarily only by its increase in viscosity. Since blends of various organopolysiloxanes can also be used in this invention, the chain length of these organopolysiloxanes may vary over a broad range. A range of from 2 to 2,000 silicon atoms per molecule, which corresponds to a viscosity of from 0.5 to 1 million mPa.s at 25° C., is generally the preferred range for most applications.

Generally, all compounds having mesogenic properties are useful as mesogenic molecules, if they contain a functional vinyl group which is capable of grafting to the organopolysiloxane backbone.

Functional groups which exhibit mesogenic properties have previously been described in the literature. Reference is made to a comprehensive description by Dietrich Demus et al, "Liquid Crystals in Tables", VEB Deutscher Verlag fur Grundstoffindustrie, Leipzig, 1974.

Derivatives of cyclohexane, such as phenyl cyclohexanecarboxylate, cyclohexyl phenyl ether, cyclohexylbenzenes, cyclohexyl cyclohexylcarboxylate, dicyclohexyl derivatives, etc., are examples of mesogenic molecules. Other examples are derivatives of stilbene, phenyl benzoate, benzylideneaniline, azobenzene, azoxybenzene, alkyl and alkoxy derivatives of biphenyl and steroids such as derivatives of cholesterol and cholestane.

Chiral structures which have no mesogenic properties themselves, i.e., unless they are grafted onto the polysiloxane backbone, are often suitable as mesogenic molecules, to produce compositions having cholesteryl phases together with nematogenic components.

A flexible linkage should exist between the mesogenic function and an organopolysiloxane backbone, which contains at least 3 methylene groups.

It is often desirable that the mesogenic function contain polar groups such as nitrile groups for example, in order to obtain a high dielectric anisotropy effect.

Although, it is not absolutely essential, the grafting reaction may be carried out in solvents such as petroleum ether, benzene, toluene or tetrahydrofuran.

Although the reaction temperature is not a critical parameter, it is preferred that the reaction be conducted in a range of from 30° to 120° C.

Examples of suitable catalysts which promote the grafting reaction are finely divided metallic metals such as platinum, ruthenium, rhodium or palladium, finely divided metallic metals supported on carriers such as activated carbon, as well as compounds and complexes of these elements, such as $PtCl_4$, $H_2PtCl_6 \cdot 6 H_2O$, Pt-olefin complexes, Pt-alcohol complexes, Pt-ether complexes and the like.

The compositions of this invention can be tailored to the requirements of a particular application over a wide range of viscosity. By selecting the proper mesogenic grafting, the range for the liquid crystal existence can be specifically adjusted for a given application in relation to the position and temperature range in which the liquid crystal phase exists. An additional regulating parameter is available for this purpose by varying the density and distribution of the mesogenic molecules on the organopolysiloxane backbone.

Other advantages of the compositions of this invention are their temperature and chemical stability.

Moreover, it is particularly surprising that the macromolecular systems of this invention can be formulated so that the liquid crystal phases can be obtained at or even below room temperature.

The compositions having the liquid crystal phases in accordance with this invention can be used to indicate temperatures. Such applications are found, for example, in the areas of medicine, non-destructive materials testing (heat flow procedures), or in the solution of testing problems in microelectronics. An important area of use for these compositions is opening up in the field of optical indication of electrical and magnetic fields (optoelectronics). Other areas of use are electrographic processes, light modulation or as components of polarizing films.

The invention is further illustrated in the following examples.

EXAMPLE 1

A graft polymer of 4-methoxyphenyl-4-(2-propenoxy)benzoate and methylhydrogenpolysiloxane was prepared by treating 4-hydroxybenzoic acid with allyl bromide in the presence of a caustic soda solution and thereafter recrystallizing the crude product from ethanol. The free acid was then boiled under reflux with an excess of thionyl chloride and the unreacted thionyl chloride was removed under vacuum, and the remaining acid chloride was taken up in tetrahydrofuran.

An equimolar amount of a solution of the acid chloride in tetrahydrofuran was added dropwise to a solution containing 4-methoxyphenol in tetrahydrofuran with cooling. The reaction temperature was 5° C. After the addition was complete, the mixture was boiled under reflux for one hour. The reaction product was then poured into ice water, neutralized and the crude product which precipitated was filtered off. The 4-methoxyphenol-4-(2-propenoxy) ester obtained was then recrystallized from ethanol.

Equimolar amounts of a methylhydrogenpolysiloxane having the formula

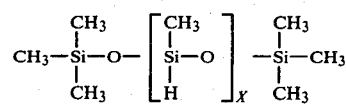

where X=120 and the ester described above were dissolved in tetrahydrofuran.

Hexachloroplatinic acid was then added at 100 ppm based on the total weight and the reaction mixture was stored overnight at 50° C. The organopolysiloxane thus obtained was precipitated with methanol and dried under vacuum. The resultant product was tested for liquid crystal properties by using a polarizing microscope and also by differential scanning calorimetry (DSC) and by X-ray structure analysis. The results are shown in the following table.

| Glass Temperature | Nematic Phase | Isotropic Liquid |
|---|---|---|
| (°K.) | (°K.) | (°K.) |
| 288 | 288–334 | above 334 |

COMPARISON EXAMPLE 1

Monomeric 4-methoxyphenyl-4-(2-propenoxy)benzoate was tested for liquid crystal properties in accordance with Example 1. At a temperature of 362° K., the compound passed from the crystalline state into the isotropic state with no meso phase being observed.

EXAMPLE 2

A graft polymer of 4-methoxyphenyl-4-(3-butenoxy)-benzoate with methylhydrogenpolysiloxane was prepared in accordance with the procedure described in Example 1. The results are shown in the following table.

| Glass Temperature | Nematic Phase | Isotropic Liquid |
|---|---|---|
| (°K.) | (°K.) | (°K.) |
| 288 | 288–358 | above 358 |

EXAMPLE 3

A graft polymer of 4-(n-hexyloxy)phenyl-4-(2-propenoxy)benzoate with methylhydrogenpolysiloxane was prepared in accordance with the procedure described in Example 1. The results are shown in the following table.

| Glass Temperature | Smectic Phase | Isotropic Liquid |
|---|---|---|
| (°K.) | (°K.) | (°K.) |
| 288 | 288–385 | above 385 |

EXAMPLE 4

A graft polymer of 4-nitrilophenyl-4-(2-propenoxy)-benzoate was prepared in accordance with the procedure described in Example 1. The results are shown in the following table.

| Glass Temperature | Smectic Phase | Isotropic Liquid |
|---|---|---|
| (°K.) | (°K.) | (°K.) |

-continued

| Glass Temperature | Smectic Phase | Isotropic Liquid |
| --- | --- | --- |
| 293 | 293–334 | 334 |

COMPARISON EXAMPLE 2

Monomeric 4-nitrilophenyl-4-(2-propenoxy)benzoate of Example 4 was tested for liquid crystal properties. At 376° K. the compound passed from the crystalline state into the isotropic liquid state without showing a meso phase.

EXAMPLE 5

A graft polymer of cholesteryl-3-butenoate with methylhydrogenpolysiloxane was prepared from 3-butenoyl chloride by esterification with cholesterol. The grafting was carried out in accordance with the procedure described in Example 1. The results are shown in the following table.

| Glass Temperature (°K.) | Smectic Phase (°K.) | Isotropic Liquid (°K.) |
| --- | --- | --- |
| 318 | 318–388 | 388 |

EXAMPLE 6

An intramolecular graft polymer of cholesteryl-3-butenoate and 4-methoxyphenyl-4-(3-butenoxy)benzoate with methylhydrogenpolysiloxane is prepared in the following manner:

The mesogenic compounds are prepared in accordance with the procedure described in Examples 2 and 5. The intramolecular graft polymer was prepared in accordance with the procedure of Example 1, except that a mixture of cholesteryl-3-butenoate and 4-methoxyphenyl-4-(3 butenoxy)benzoate was used in the ratio of (a) 5 mole percent of cholesteryl-3-butenoate and 95 mole percent of 4-methoxyphenyl-4-(3-butenoxy)benzoate
(b) 15 mole percent of cholesteryl-3-butenoate and 85 mole percent of 4-methoxyphenyl-4-(3-butenoxy)benzoate so that the grafting reaction took place intramolecularly, i.e., both components are chemically bonded to the same macromolecule, in the ratio indicated above. The results are shown in the following table.

| Fraction of Cholesteryl-3-butenoate mole percent | Glass Temperature °K. | Cholesteryl Phase °K. | Isotropic Liquid °K. |
| --- | --- | --- | --- |
| 5 | 288 | 288–354 | above 354 |
| 15 | 294 | 294–353 | above 353 |

The reflection wavelength of the organopolysiloxane grafted with a 5 mole percent fraction of cholesteryl-3-butenoate still lies directly in the visible range, and it appears red, whereas in an organopolysiloxane modified with a 15 mole percent fraction of cholesteryl-3-butenoate component, the reflection wavelength is shifted into the green region.

We claim:

1. A composition having a liquid crystal phase which contains at least one liquid crystalline component consisting of an organopolysiloxane backbone having at least two mesogenic molecules chemically bonded thereto as side chains, in which the component is obtained from the reaction of an organohydrogenpolysiloxane containing Si-bonded hydrogen with vinyl-substituted mesogenic molecules.

2. The composition of claim 1, wherein the organopolysiloxane contains from 2 to 2000 Si-atoms.

3. The composition of claim 1, wherein the component has a linkage between the mesogenic function and the organopolysiloxane backbone, which contains at least 3 methylene groups.

4. The composition of claim 1, wherein the component is obtained from an organohydrogenpolysiloxane in which the number of SiH-bonds, does not exceed the number of Si-atoms.

5. The composition of claim 1, 2, 3 or 4, wherein the component has a nematic or a cholesteric phase.

6. The composition of claim 1, 2, 3 or 4, wherein at least one component consists of an organopolysiloxane backbone which carries intermolecularly chemically bonded nematogenic and cholesterogenic or chiral molecules as side chains.

* * * * *